United States Patent
Sainio et al.

(10) Patent No.: US 6,291,590 B1
(45) Date of Patent: Sep. 18, 2001

(54) EXTRUSION COATING STRUCTURE

(75) Inventors: Markku Sainio; Erkki Laiho; Martti Vähälä; Hannu Salminen, all of Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/341,426

(22) PCT Filed: Jan. 7, 1998

(86) PCT No.: PCT/FI98/00014

§ 371 Date: Sep. 7, 1999

§ 102(e) Date: Sep. 7, 1999

(87) PCT Pub. No.: WO98/30628

PCT Pub. Date: Jul. 16, 1998

(30) Foreign Application Priority Data

Jan. 10, 1997 (FI) ............................................. 970121

(51) Int. Cl.$^7$ ............................. C08L 23/08; B32B 27/32
(52) U.S. Cl. .................. 525/191; 525/240; 428/474.4; 428/475.8; 428/476.1; 428/480; 428/483; 428/500; 428/507; 428/511; 428/532; 428/535; 428/537.5; 428/688
(58) Field of Search ................................ 525/191, 240; 428/474.4, 475.8, 476.1, 480, 483, 500, 507, 511, 532, 535, 537.5, 688

(56) References Cited

U.S. PATENT DOCUMENTS

| | | | |
|---|---|---|---|
| 5,338,589 | 8/1994 | Bohm et al. | 428/36.9 |
| 5,371,145 | 12/1994 | Daniell et al. | 525/240 |
| 5,494,965 | * 2/1996 | Harlin et al. | 525/52 |
| 5,631,069 | * 5/1997 | Wooster et al. | 428/220 |
| 5,674,342 | 10/1997 | Obijeski et al. | 156/244.11 |
| 6,090,893 | * 7/2000 | Harlin et al. | 525/240 |

FOREIGN PATENT DOCUMENTS

| | | |
|---|---|---|
| 9212182A1 | 7/1992 | (WO) . |
| 9616119A1 | 5/1996 | (WO) . |
| 9618677A1 | 6/1996 | (WO) . |
| 97 03124A1 | 1/1997 | (WO) . |

* cited by examiner

Primary Examiner—Nathan M. Nutter
(74) Attorney, Agent, or Firm—Birch Stewart Kolasch & Birch, LLP

(57) ABSTRACT

Extrusion coating structure in which at least one layer is made of a polymer composition comprising a multimodal ethylene polymer, which contains from 80 to 100% by weight of ethylene repeating units and from 0 to 20% by weight of $C_3$–$C_{10}$ alpha-olefin repeating units, has a density of between 0.920 and 0.960 kg/m$^3$, and which is a blend of at least two different ethylene polymers.

15 Claims, No Drawings

EXTRUSION COATING STRUCTURE

This application is the national phase under 35 U.S.C. §371 of PCT International Application No. PCT/FI98/00014 which has an International filing date of Jan. 7, 1998, which designated the United States of America.

The invention relates to a multimodal ethylene polymer based extrusion coating composition and its use for coating a paper or board substrate.

The purpose of this invention is to provide a polyethylene composition for extrusion coating having good processability and good mechanical properties.

The normal polyethylene extrusion coating grades currently in the market, are low density polyethylenes obtained from high pressure process. Typically, such low density polyethylenes have good processability, but inferior environmental stress crack resistance (ESCR) and seal strength as well as poor hot tack when compared with linear polyethylenes.

Also some linear polyethylenes, high density, medium density and linear low density polyethylenes are used in extrusion coating applications. However, the extrusion coating compositions are normally prepared by blending linear materials with high pressure low density polyethylene in order to achieve sufficient processability. The problem with linear materials is their poor processability. That has been overcome to some extent by blending the linear material with high pressure low density polyethylene. The benefit of linear polyethylenes is their better mechanical strength allowing thinner coatings.

The addition of high pressure low density polyethyllene (PE-LD) to linear high density or low density polyethylene (PE-HD or PE-LLD) usually leads to a loss in mechanical and barrier properties. Another drawback of blends is the extra cost caused due to the additional compounding step, where the blend of PE-HD or PE-LLD and high pressure PE-LD is made.

The idea of the present invention is to use a bimodal or multimodal linear polyethylene material in extrusion coating without adding any high pressure PE-LD. The bimodality or multimodality of the ethylene polymer of this invention ensures a sufficient throughput while the superior mechanical properties of linear polyethylenes are maintained. The material is especially suitable for coextrusion.

The purpose of the invention has been achieved with a polymer composition comprising a multimodal ethylene polymer, which contains from 80 to 100% by weight of ethylene repeating units and from 0 to 20% by weight of $C_3$–$C_{10}$ alpha-olefin repeating units, has a density of between 0.920 and 0.960 g/cm$^3$, and which is a blend of at least two different ethylene polymers.

By a multimodal ethylene polymer is in connection with the present invention meant an ethylene polymer having broad molecular weight distribution produced by blending two or more ethylene polymer components with different molecular weights or by polymerizing ethylene to different molecular weights in a process with two or more reactors in series. By contrast, a unimodal polyethylene, like those conventionally used in extrusion coating, is obtained from only one ethylene polymer component produced in only one step.

The extrusion coating composition according to the present invention is a multimodal ethylene polymer. The multimodal ethylene polymer is by definition a blend of at least two ethylene polymers having different molecular weights. According to an important embodiment of the present invention, said blend is the product of polymerization process comprising at least two steps. In the process, the first ethylene polymer is prepared by polymerizing ethylene in the presence of a catalyst system in the first step and the second polymer is prepared by (co)polymerizing ethylene and optionally a higher alpha olefin in the presence of a catalyst system in the second step. Said steps can be performed in any order.

The idea of the present invention can be realized with any kind of ethylene polymerization catalyst, such as chromium catalyst, a Ziegler-Natta catalyst or a metallocene catalyst. Typical catalyst systems are e.g prepared according to WO91/12182 and WO95/35323 which are herewith included by reference. A preferential single site polymerization catalyst system is that based on a group 4 metal metallocene and alumoxane.

When performing said polymerization process comprising at least two steps, one or more catalyst systems, which may be the same or different, can be used. It is preferential, if the blend of ethylene polymers is the product of the polymerization process, that the same catalyst system is used in the subsequent steps.

The most convenient way to control the molecular weight during the multistep polymerization is to use hydrogen, which acts as a chain-transfer agent by intervening in the insertion step of the polymerization mechanism. Hydrogen may be added in suitable amounts to any step of the multistep polymerization.

It is prior known to prepare multimodal and especially bimodal olefin polymers in two or more polymerization reactors in serie. Such processes are exemplified by EP 040992, EP041796, EP 022376 and WO92/12182 which are hereby included as reference concerning the preparation of multimodal ethylene polymers for the claimed extrusion coating material. According to these references each of said polymerization step can be performed in liquid phase, slurry or gas phase.

According to the present invention, it is preferential to perform said polymerization steps as a combination of slurry polymrization and gas phase polymerization. Preferentially the first step is a slurry polymerization and the second step a gas phase polymerization.

The slurry polymerization is preferentially performed in a so called loop reactor. The gas phase polymerization is performed in a gas phase reactor. The polymerization steps can optionally be preceded by a prepolymerization, whereby up to 20% by weight and preferentially 1–10% by weight of the total ethylene polymer amount is formed.

According to another important embodiment of the invention, the multimodal ethylene polymer can be produced by mixing at least two ethylene polymers having different average molecular weights.

A suitable melt flow rate MFR$_2$ of the ethylene polymer blend is between 1 and 30 g/10 min.

The molecular weight distribution curve of a multimodal ethylene polymer shows either several peaks or a broad peak lacking small fractions of extremely low and extremely high molecular weight fractions.

Of course, the finished polymerization or mixing product can be further treated to modify its average molecular weight and molecular weight distribution according to the application to which the material is used.

The polymer composition of this invention is suitable for extrusion coating of fiber based materials like paper and paperboard. The grammage of paper or paperboard substrate is typically 20 g/m$^2$–400 g/m$^2$.

The substrate used in the extrusion coating can also be a plastic film made of polyester, polyamide, cellophane, polypropylene and oriented polypropylene. When using plastic film substrate, the thickness is typically 10 μm–80 μm.

In addition, also aluminium subtrate can be used and then the thickness of substrate is from 6 μm to 300 μm.

The polymer composition according to this invention can be used as the only extrusion coating layer over the substrate or it can be used in multilayer products as one layer or several layers.

Depending on the final product, it is, of course, possible to use extrusion coating structures in which the multimodal ethylene polymer blend is used together with certain other polyethylene. That other ethylene polymer can be a high pressure low density ethylne polymer or copolymer or a unimodal linear ethylene polymer. The multimodal polymer and the other polymer are mixed before the extrusion coating.

The invention is described in more detail in the following examples.

Materials used in the Examples
LE7518=PE-LD coating grade, $MFR_2$=7.5 g/10 min, density 0.918 g/cm$^3$.
LE4524=PE-LD coating grade, $MFR_2$=4.5 g/10 min, density 0.923 g/cm$^3$
Dowlex3010=PE-LLD, manufacturer Dow
Polymer A=Medium density multimodal ethylene polymer
Polymer B=Linear low density multimodal ethylene polymer
Polymer C=Linear low density multimodal ethylene polymer
Properties of polymers A, B and C are given in Table 1.

All polymers except Dowles3010 are manufactured by Borealis Polymers Oy.

TABLE 1

| Polymer | A | B | C |
|---|---|---|---|
| Loop MFR, g/10 min | 130 | 100 | 100 |
| Loop density, kg/m$^3$ | 960 | 941 | 941 |
| Final MFR, g/10 min | 10 | 13 | 9 |
| Final density, kg/cm$^3$ | 942 | 930 | 931 |
| FRR21/2 | 41 | 37 | 39 |

Production of Multimodal Polymers

EXAMPLE 1

(Polymer A)

In a loop reactor was produced polyethene with $MFR_2$ 130 g/10 min and density 960 kg/m$^3$. Then, the polymer containing the active catalyst was transferred into a gas phase reactor where the polymerization was continued in such conditions that the $MFR_2$ of the final polymer A was 10 g/10 min, density 942 kg/m$^3$ and FRR21/2 was 41.

EXAMPLE 2

(Polymer B)

In a loop reactor was produced polyethene with $MFR_2$ 100 g/10 min and density 941 kg/m$^3$. Then, the polymer containing the active catalyst was transferred into a gas phase reactor where the polymerization was continued in such conditions that the $MFR_2$ of the final polymer B was 13 g/10 min, density 930 kg/m$^3$ and FRR21/2 was 37.

EXAMPLE 3

(Polymer C)

In a loop reactor was produced polyethylene with $MFR_2$ 100 g/10 min and density 941 kg/m$^3$. Then, the polymer containing the active catalyst was transferred into a gas phase reactor where the polymerization was continued in such conditions that the $MFR_2$ of the final polymer C was 9 g/10 min, density 931 kg/m$^3$ and FRR21/2 was 39.

Coating Tests

EXAMPLE 4

Coating test runs were carried out using a Beloit-pilot extrusion coating line. In test runs two extruders with L/D 24D/114 mm screws, max. output 450 kg/h of each, were used.

All tested samples were first processed to monolayer coatings, meaning that same material was used in both extruders. The same method was applied to testing of dry blends of higher density multimodal polymers (=polymer A) and basic PE-LD coating grade. The proportion of PE-LD in dry blends was 15 w-%.

During the coating process of multimodal MD product (polymer A) it was seen that the motorload of extruders was lower compared to processing of present extrusion coating PE-LLD grade (Dowlex3010). The maximum screw speed with Polymer A was 100 rpm, while with normal PE-LLD grade only level of 90 rpm was reached. The benefit becomes stronger when the melt temperature setting for the multimodal medium density ethylene polymer (A) was lower (300° C.) than the same setting for normal PE-LLD (315° C.).

The multimodal products of lower density level (=polymer B and C) were tested besides monolayer testing also as coextrusion materials. In coextrusion testing extruder I was used for PE-LD and extruder II for multimodal material. In that way multimodal material became the outer layer of the structure. All tests were made with both polymers B and C.

The optimal melt temperature setting was searched regarding to $MFR_2$ of each tested sample. The materials were tested with various coating weights and line speeds. The substrate used in all tests was brown 70 g/m$^3$ UG-paper.

Coating weight variation, edge weaving of the coating polymer and neck-in values were all in very reasonable level with LE7518+multimodal LLD (B and C) coextruded structures. It was seen during the test runs that support layer of 2 g/m$^2$ LE7518 with multimodal LLD (polymer B and C) layer being 8 g/m$^2$ is adequate.

There were plenty of advantages compared to high pressure PE-LD extrusion coating polymers, when examinating the final-product properties of multimodal materials. Especially, the hot tack strength was clearly in a higher level; the value of coextruded LE7518+multimodal LLD (B and C), 15+15 g/m$^2$ structure, was 3.5 N/15 mm when PE-LD LE4524 has a value 2.5 N/15 mm. The puncture strength index for coextruded multimodal LLD was 4.9, while LE4524 has the index 3.1. The elongation in machine direction for multimodal LLD coextruded was 6.3% compared to only 2.1% for LE4524. Also the cross direction elongation was clearly better, value was 9.2%, while LE4524 has a limit in 4.7%. There are no pinholes in coextruded multimodal LLD coatings even when the coating weight was as low as 10 g/m$^2$ (2 g/m$^2$LE7518+8 g/m$^2$ polymer C).

What is claimed is:

1. An extrustion structure wherein at least one layer is made of a polymer composition comprising multimodal polymer, which contains from 80 to 100% by weight of ethylene repeating units and from 0 to 20% by weight of $C_3$–$C_{10}$ alpha-olefin repeating units, has a density of between 0.920 and 0.960 g/cm$^3$, which is a blend of at least two different ethylene polymers, with the melt flow rate $MRF_2$ of the blend being between 9 and 13 g/10 min, and which is applied to a substrate.

2. An extrusion coating structure according to claim 1 wherein the ethylene polymer blend is a product of a process in which a first ethylene polymer is prepared by polymerizing ethylene in the presence of a catalyst system in a first step and a second polymer is prepared by polymerizing ethylene in the presence of a catalyst system in a second step.

3. Extrusion coating structure according to claim 1 characterized in that the ethylene polymer blend is produced by mixing at least two ethylene polymers having different average molecular weights.

4. An extrusion coating structure according to claim 1 wherein said substrate of the coating structure is fiber based paper or paperboard.

5. Extrusion coating structure according to claim 4 characterized in that the grammage of paper or paperboard substrate is 20 $g/m^2$–400 $g/m^2$.

6. An extrusion coating structure according to claim 1 wherein said substrate of the coating is a plastic film made of polyester, polyamide, polypropylene or cellophane.

7. Extrusion coating structure according to claim 6 characterized in that the thickness of the plastic film substrate is 10 $\mu$m–80 $\mu$m.

8. Extrusion coating structure according to claim 1 characterized in that the substrate of the coating is made from aluminium.

9. Extrusion coating structure according to claim 8 characterized in that the thickness of the aluminium substrate is from 6 $\mu$m to 300 $\mu$m.

10. Extrusion coating structure according to claim 1 characterized in that the ethylene polymer blend is used as the only coating layer in an extrusion coating structure.

11. Extrusion coating structure according to claim 1 characterized in that the ethylene polymer blend is used as layer in a coextruded coating structure.

12. Extrusion coating structure according to claim 11 characterized in that the layer made from the ethylene polymer blend is used as nearest to the substrate, as a mediate layer or as a surface layer.

13. An extrusion coating structure according to claim 1 wherein said ethylene polymer blend is used mixed with another polyethylene.

14. An extrustion coating structure according to any of the preceding claims wherein said another ethylene polymer is a high pressure low density ethylene polymer or copolymer.

15. Extrusion coating structure according to claim 13 characterized in that the other ethylene polymer is unimodal linear ethylene polymer.

* * * * *